US012597057B2

(12) United States Patent
Harting et al.

(10) Patent No.: US 12,597,057 B2
(45) Date of Patent: Apr. 7, 2026

(54) SYSTEMS AND METHODS FOR IDENTIFYING REDUCTIONS

(71) Applicant: Capital One Services, LLC, McLean, VA (US)

(72) Inventors: Eric Harting, Arlington, VA (US); David Jacob Robison, Washington, DC (US); Jordan Mandi Gross, Herndon, VA (US); Gillian Martin, Denver, CO (US)

(73) Assignee: Capital One Services, LLC, McLean, VA (US)

( * ) Notice: Subject to any disclaimer, the term of this patent is extended or adjusted under 35 U.S.C. 154(b) by 131 days.

(21) Appl. No.: 18/526,257

(22) Filed: Dec. 1, 2023

(65) Prior Publication Data

US 2025/0182178 A1      Jun. 5, 2025

(51) Int. Cl.
*G06Q 30/00*          (2023.01)
*G06Q 30/0207*      (2023.01)
*G06Q 30/0601*      (2023.01)

(52) U.S. Cl.
CPC ..... *G06Q 30/0625* (2013.01); *G06Q 30/0239* (2013.01); *G06Q 30/0641* (2013.01)

(58) Field of Classification Search
CPC ................................................ G06Q 30/0625
See application file for complete search history.

(56) References Cited

U.S. PATENT DOCUMENTS 8,175,964 B2      5/2012  Arfin
12,165,166 B2 *  12/2024  Engle ..................... G06Q 20/12

2014/0149214 A1*   5/2014  Argue ................ G06Q 30/0255
                                                                  705/14.53
2018/0114245 A1    4/2018  Lurie et al.
2018/0150869 A1*   5/2018  Finnegan ........... G06Q 30/0239
2021/0365976 A1   11/2021  Johnson et al.
2022/0058680 A1*   2/2022  Engle ................. G06Q 30/0222
2023/0127769 A1*   4/2023  Rim ................... G06Q 30/0627
                                                                  705/26.64

OTHER PUBLICATIONS

Keller, Alisa, Mila Vogelsang, and Dirk Totzek. "How displaying price discounts can mitigate negative customer reactions to dynamic pricing." Journal of Business Research 148 (2022): 277-291.*

* cited by examiner

*Primary Examiner* — Kathleen Palavecino
(74) *Attorney, Agent, or Firm* — Bookoff McAndrews, PLLC

(57) ABSTRACT

Disclosed are methods and systems for identifying on-line reductions. For instance, a user interaction may be monitored to detect a first on-line platform being launched, and a user input may be received associated with the first on-line platform. An item associated with the first on-line platform, and one or more potential reductions associated with the item are automatically identified. Responsive to the identification of the one or more potential reductions, an electronic application is displayed including an indication of the one or more potential reductions at a display of the user input device, the electronic application operating in conjunction with the first on-line platform and including a user-selectable link that updates the first on-line platform to display the one or more potential reductions for the item on the first platform, or causes display of a second on-line platform to display the one or more potential reductions.

20 Claims, 6 Drawing Sheets

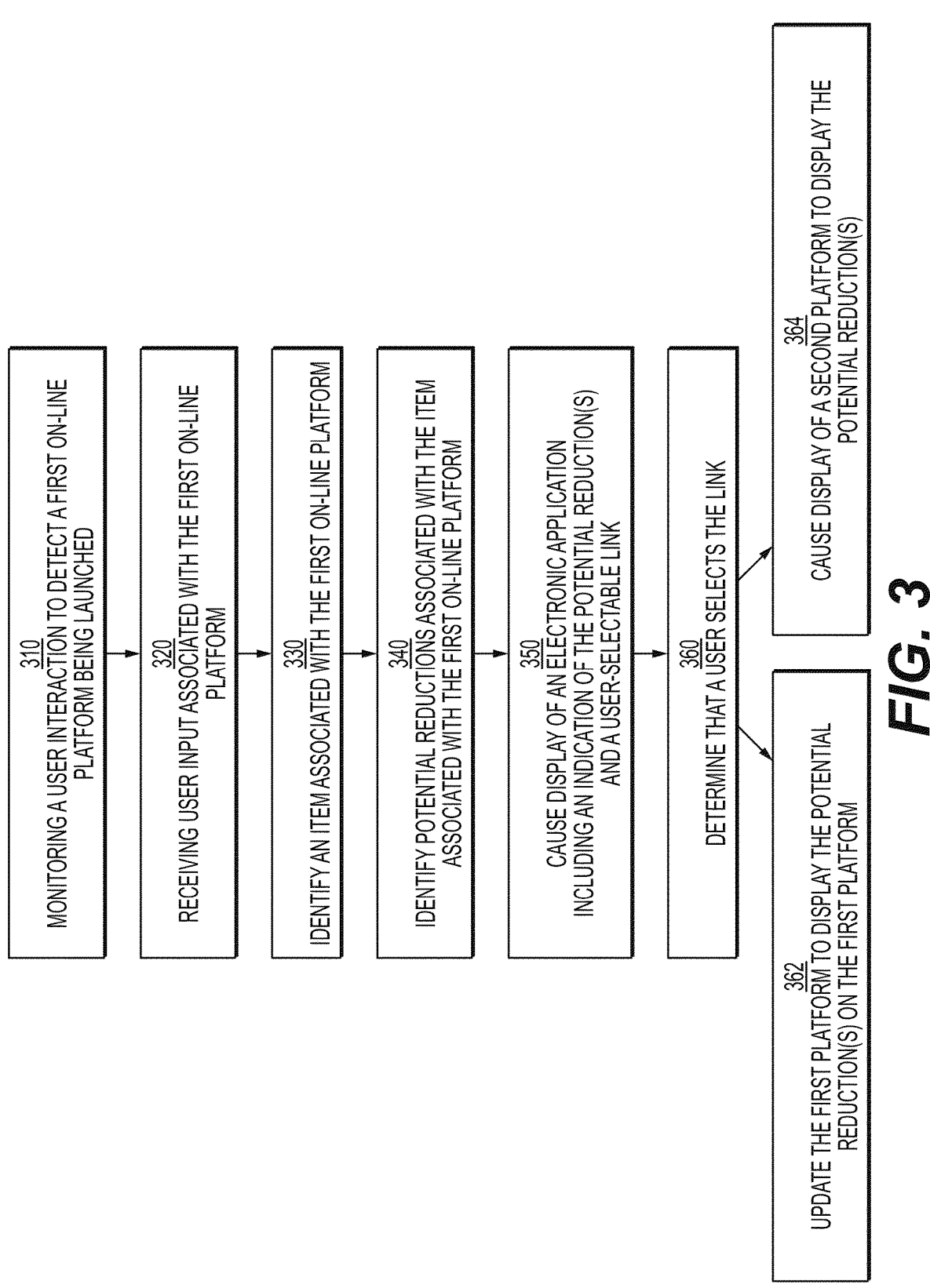

310
MONITORING A USER INTERACTION TO DETECT A FIRST ON-LINE PLATFORM BEING LAUNCHED

320
RECEIVING USER INPUT ASSOCIATED WITH THE FIRST ON-LINE PLATFORM

330
IDENTIFY AN ITEM ASSOCIATED WITH THE FIRST ON-LINE PLATFORM

340
IDENTIFY POTENTIAL REDUCTIONS ASSOCIATED WITH THE ITEM ASSOCIATED WITH THE FIRST ON-LINE PLATFORM

350
CAUSE DISPLAY OF AN ELECTRONIC APPLICATION INCLUDING AN INDICATION OF THE POTENTIAL REDUCTION(S) AND A USER-SELECTABLE LINK

360
DETERMINE THAT A USER SELECTS THE LINK

362
UPDATE THE FIRST PLATFORM TO DISPLAY THE POTENTIAL REDUCTION(S) ON THE FIRST PLATFORM

364
CAUSE DISPLAY OF A SECOND PLATFORM TO DISPLAY THE POTENTIAL REDUCTION(S)

*FIG. 3*

SYSTEMS AND METHODS FOR IDENTIFYING REDUCTIONS

TECHNICAL FIELD

Various embodiments of the present disclosure relate generally to systems and methods for identifying reductions.

BACKGROUND

Users often use on-line shopping platforms to purchase a wide variety of items, often finding the on-line shopping experience more convenient or otherwise favorable. Some items that users may shop for are subject to rebates, incentives, and other reductions that could provide the user with significant savings if they are made aware of and apply the reductions. However, determining whether a rebate, incentive, or other reduction is available to the user and for the specified item may be a time-intensive task that is difficult to navigate.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods for identifying reductions are described.

In some aspects, the techniques described herein relate to a computer-implemented method for identifying on-line reductions, the computer-implemented method including: monitoring, by one or more processors, a user interaction to detect a first on-line platform being launched; receiving, by one or more processors, from a user input device associated with a user, user input associated with the first on-line platform; identifying, by one or more processors, an item associated with the first on-line platform; automatically identifying, by the one or more processors, one or more potential reductions associated with the item; responsive to identifying the one or more potential reductions, causing display of an electronic application including an indication of the one or more potential reductions at a display of the user input device, the electronic application operating in conjunction with the first on-line platform and including a user-selectable link; upon determining that the user selects the user-selectable link, updating the first on-line platform to display the one or more potential reductions for the item on the first platform, or causing display of a second on-line platform on the display of the user device and displaying the one or more potential reductions for the item on the second on-line platform.

In some aspects, the techniques described herein relate to a computer-implemented method for identifying on-line reductions for electric vehicles, the computer-implemented method including: monitoring, by one or more processors, a user interaction to detect a first on-line platform being launched; receiving, by one or more processors, from a user input device associated with a user, user input associated with the first on-line platform; identifying, by one or more processors, that the first on-line platform is a platform for purchasing vehicles; automatically identifying, by the one or more processors, one or more potential reductions associated with the vehicles; responsive to identifying the one or more potential reductions, causing display of an electronic application including an indication of the one or more potential reductions at a display of the user input device, the electronic application operating in conjunction with the first on-line platform and including a user-selectable link; upon determining that the user selects the user-selectable link, updating the first on-line platform to display the one or more potential reductions for the electric vehicle on the first on-line platform, or causing display of a second on-line platform on the display of the user device and displaying the one or more potential reductions for the electric vehicle on the second on-line platform.

In some aspects, the techniques described herein relate to a computer-implemented method for identifying on-line reductions, the computer-implemented method including: monitoring, by one or more processors, a user interaction to detect an on-line platform being launched; receiving, by one or more processors, from a user input device associated with a user, user input associated with an on-line platform; identifying, by one or more processors, an item associated with the on-line platform; automatically identifying, by the one or more processors, one or more potential reductions associated with the item; responsive to identifying the one or more potential reductions, causing display of an indication of the one or more potential reductions and a user-selectable link at a display of the user input device; and upon determining that the user selects the user-selectable link, causing display of a second platform on the display of the user device, and displaying the one or more potential reductions for the item on the second platform.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts a flowchart of an exemplary method of identifying reductions, according to one or more embodiments.

DETAILED DESCRIPTION OF EMBODIMENTS

Figure 1:
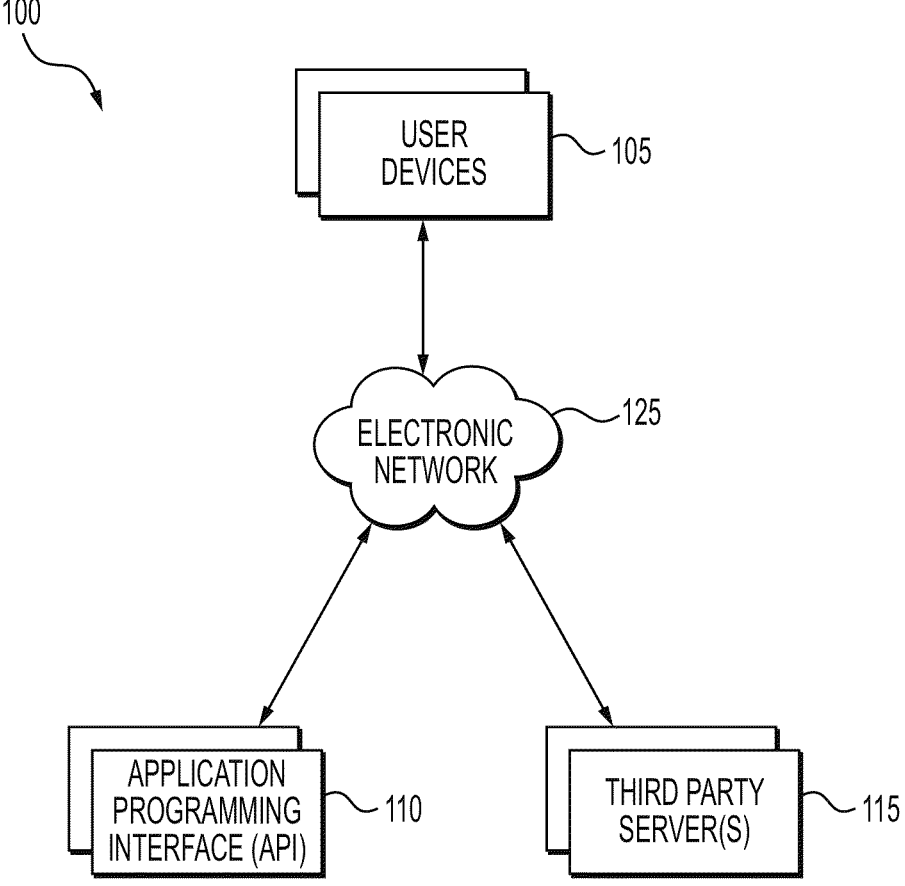
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first user device could be termed a second user device, and, similarly, a second user device could be termed a first user device, without departing from the scope of the various described embodiments. The first user device and the second user device are both user devices, but they are not the same user device.

In general, the present disclosure is directed to systems and methods for identifying, recommending, and/or transmitting reductions associated with on-line shopping interactions. The methods and systems according to the present disclosure offer significant technical benefits which will become apparent. For example, aspects of the present disclosure may significantly improve a likelihood of successfully identifying the rebates, incentives, and other reductions available to a user via a specific, structured, graphical user interface (GUI). Technical effects of the techniques disclosed herein include generating GUIs based on user inputs that pair with specific uniform resource locators (URLs) and call upon specific application programming interfaces (APIs).

For example, a user may desire to purchase a vehicle. The user may launch a first on-line platform that is associated with the sale of vehicles on an electronic application of a user device, such as on a web browser of a personal computer or a mobile application on a smart phone or other mobile device. Upon identification of the user's interaction with the on-line platform for shopping for vehicles, an electronic application may be launched or displayed that indicates that one or more reductions may be available for vehicles offered for sale on the on-line platform. These reductions may include, for example, tax rebates and government incentives for the purchase of electric vehicles or other vehicles with reduced emissions. The electronic application may include a user-selectable link that, if selected by the user, updates the display of the first on-line platform to include the reductions in the prices of the vehicles for sale. This allows a user to compare prices of vehicles for sale with the reductions included, which may encourage users to purchase electric vehicles or other vehicles with reduced emissions, where they otherwise may not have had access to the reduction information.

Embodiments of the present disclosure offer the foregoing technical solutions to address the foregoing needs, as described in detail below.

FIG. 1 depicts an exemplary computing environment 100 that may be utilized with techniques presented herein. One or more user device(s) 105, an application programming interface 110, and a third party server 115 may communicate across an electronic network 125. The user device 105 may be associated with, and used by, a user. The systems and devices of the computing environment 100 may communicate in any arrangement. As will be discussed herein, systems and/or devices of the computing environment 100 may communicate in order to generate, transmit, and/or obtain on-line platforms and electronic applications.

The user device 105 may be a computer system such as, for example, a desktop computer, a mobile device, etc. In an exemplary embodiment, the user device 105 may be a cellphone, a tablet, or the like. In some embodiments, the user device 105 may include one or more electronic application(s), e.g., a program, plugin, browser extension, etc., installed on a memory of the user device 105. In some embodiments, the electronic application(s) may be associated with one or more of the other components in the computing environment 100. For example, the electronic application(s) may include a web browser, another application, or the like configured to allow access to products or services offered by an entity associated with the third party server 115. In some embodiments, the electronic applications may include online shopping software associated with a merchant and/or a web browser configured to access such online shopping software. In some embodiments, the electronic applications may include applications associated with government services for which a user identity and/or account is required for access. In some embodiments, the electronic applications may include other types of applications and/or services for which a form of membership is required, such as social media applications, rewards clubs applications, insurance applications, library applications, streaming services, or the like.

Application programming interface 110 may be a computer system that facilitates communication between user device 105 and a computer system corresponding to and maintained by a custodian and/or issuer of an item. Application programming interface 110 may comprise one or more server devices and the one or more server devices may be located in one or more physical locations. For example, application programming interface 110 may exist within a cloud infrastructure supported by a plurality of server devices distributed across multiple geographical locations. Application programming interface 110 may allow an application running on user device 105 to communicate with data servers of a custodian or issuer of an item. For example, in a case where the application running on user device 105 is that of an e-commerce merchant, application programming interface 110 may allow the application to communicate with a financial institution. Alternatively, for some other applications, application programming interface 110 may allow communication with a government entity. In other embodiments, application programming interface 110 may facilitate communication with other entities, such as insurers, membership clubs, or the like. In some embodiments, application programming interface 110 may facilitate communication with multiple custodians. For example, application programming interface 110 may serve as an aggregator for communication with multiple financial institutions or government entities.

Third party server 115 may be a computer system for hosting, running, and/or maintaining applications and/or software accessible by user device 105. Third party server 115 may comprise one or more server devices and the one or more server devices may be located in one or more physical locations. For example, third party server 115 may exist within a cloud infrastructure supported by a plurality of server devices distributed across multiple geographical locations. In some embodiments, third party server 115 may host and/or support an e-commerce application accessible by user device 105. In some embodiments, third party server 115 may host and/or support other types of applications, such as insurance applications, government services applications, social media applications, rewards membership applications, and the like.

In various embodiments, the electronic network 125 may be a wide area network ("WAN"), a local area network ("LAN"), personal area network ("PAN"), or the like. In some embodiments, electronic network 125 may be a secured network. In some embodiments, the secured network may be protected by any of various encryption techniques. In some embodiments, electronic network 125 may include the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

Although depicted as separate components in FIG. 1, it should be understood that a component or portion of a component may, in some embodiments, be integrated with or incorporated into one or more other components. Any suitable arrangement of the various systems and devices of the computing environment 100 may be used.

As discussed in further detail below, the one or more components of exemplary computing environment 100 may one or more of generate, store, train, or use a machine learning model or its applicable components or attributes such as nodes, model states, weights, layers, biases, or the like, for identifying reductions (outputs) based on user information and items associated with an on-line platform (inputs). The exemplary computing environment 100 or one of its components may include a machine learning model and/or instructions associated with the machine learning model, e.g., instructions for generating a machine learning model, training the machine learning model, using the machine learning model, etc. The exemplary computing environment 100 or one of its components may include instructions for retrieving data, adjusting data, e.g., based on the output of the machine learning model, and/or operating a display to output data, e.g., as adjusted based on the machine learning model. The exemplary computing environment 100 or one of its components may include, provide, and/or generate training data.

In some embodiments, a system or device other than the components shown in exemplary environment 100 may be used to generate, store, and/or train the machine learning model. For example, such a system may include instructions for generating the machine learning model, the training data and ground truth, and/or instructions for training the machine learning model. A resulting trained machine learning model may then be provided to exemplary computing environment 100 or one of its components. The machine learning model may be stored in any applicable location such as in memory within the third party server 115 or user device 105, in a location other than computing environment 100 in operable communication with computing environment 100, or the like.

Generally, a machine learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable. Alternatively or in addition, unsupervised learning and/or semi-supervised learning may be used to train a machine learning model.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine learning model, e.g., compare the output of the trained model with the ground truth for that portion of the training data to evaluate an accuracy of the trained model. The training of the machine learning model may be configured to cause the machine learning model to learn associations between training data (e.g., secure user data) and ground truth data, such that the trained machine learning model is configured to determine an output in response to the input data based on the learned associations.

In various embodiments, the variables of a machine learning model may be interrelated in any suitable arrangement in order to generate the output. For example, in some embodiments, the machine learning model may include image-processing architecture that is configured to identify, isolate, and/or extract features, geometry, and/or structure. For example, the machine learning model may include one or more convolutional neural networks ("CNN") configured to identify features in the data, and may include further architecture, e.g., a connected layer, neural network, etc., configured to determine a relationship between the identified features in order to determine a location in the data.

In some instances, different samples of training data and/or input data may not be independent. Thus, in some embodiments, the machine learning model may be configured to account for and/or determine relationships between multiple samples.

For example, in some embodiments, the machine learning models referenced herein may include a CNN, or Recurrent Neural Network ("RNN"). Generally, RNNs are a class of feed-forward neural networks that may be well adapted to processing a sequence of inputs. In some embodiments, the machine learning model may include a Long Short Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of items (e.g., words, letters, time series, images) as input, and generate another sequence of items (e.g., where they may convert sequences of one domain to sequences of another domain). For example, a Seq2Seq model may be configured to receive image data and output location data associated with the received image data (e.g., a location where an image was captured).

Although depicted as separate components in FIG. 1, it should be understood that a component or portion of a component in the exemplary computing environment 100 may, in some embodiments, be integrated with or incorporated into one or more other components. For example, the third party server 115 may be integrated in a data storage system. In some embodiments, operations or aspects of one or more of the components discussed above may be distributed amongst one or more other components. Any suitable arrangement and/or integration of the various systems and devices of the exemplary computing environment 100 may be used.

Further aspects of the machine learning model and/or how it may be utilized to identify reductions, etc. are described herein. In the following methods, various acts may be performed or executed by a component from FIG. 1, such as the third party server 115, the user device 105, or components thereof. However, it should be understood that in various embodiments, various components of the exemplary computing environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2A:
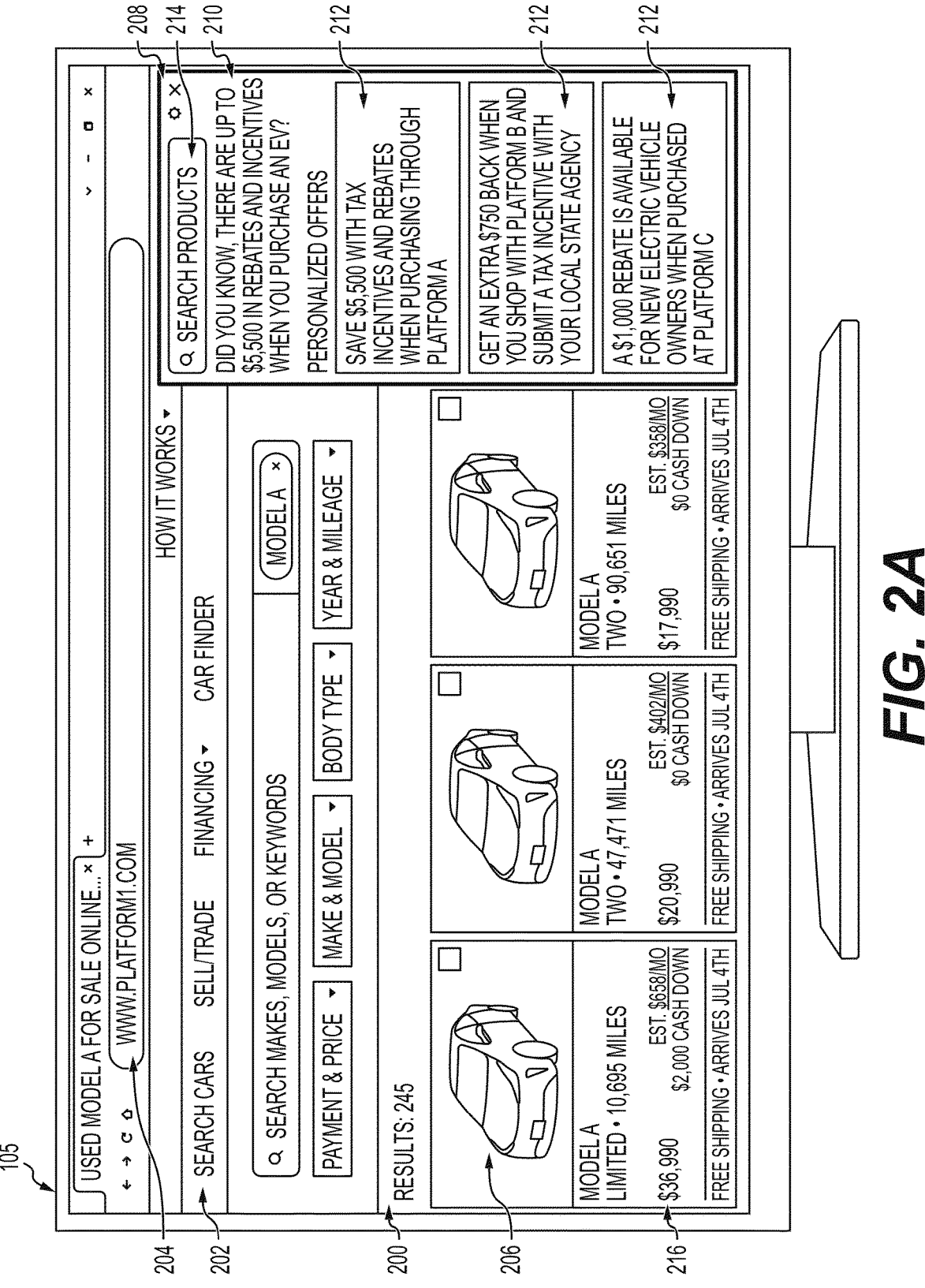
FIG. 2A depicts a sample graphical user interface (GUI) including an on-line platform, according to one or more embodiments.

FIG. 2A depicts a sample graphical user interface (GUI) 200 displayed on user device 105 including an on-line platform 202 implemented by a website 204 to implement features, functionality, or the like, according to one or more embodiments. The website 204 may be launched on a first electronic application, such as a web browser. As used herein, the term "platform" generally encompasses a program, data structure, data or code library, framework, plugin, website extension, or the like that may be incorporated into and/or operate in conjunction with a website in order to implement a feature or functionality into the website. In some examples, a website may implement a feature or functionality via a platform instead of uniquely designing the feature or functionality for that website, or the website may be one and the same with the on-line platform. Examples of a platform may include a display platform for generating a visual appearance of a website, a data storage, organization, processing, or retrieval platform, or an interaction platform for implementing interactions amongst a website, users, programs, systems, or the like. In a particular example, an interaction platform may provide e-commerce functionality to a website.

The first on-line platform 202 may include listed items 206 for sale. Upon interaction with the first on-line platform 202, an electronic application 208 may be activated. The interaction may take the form of the user selecting links, entering search data, deliberate cursor movements, such as those that indicate a search, etc. The electronic application 208 may be a program, plugin, browser extension, etc., installed on a memory of the user device 105. The electronic application 208 may be displayed on the same GUI 200 as the first on-line platform 202 and may include one or more potential reductions 210 associated the listed items 206. The display of the second electronic application 208 on the GUI 200 may take the form of a pop-up notification, a separate window, a separate tab, etc. The second electronic application 208 may further include one or more user-selectable links 212 or a data input field 214, such as a search bar, for further user interaction. The user input field 214 may be for receiving one or more data elements related to the user and updating the potential reductions based on the one or more data elements In the exemplary embodiment shown in FIG. 2A, the first on-line platform 202 may be a car shopping website 204 where the items 206 for sale includes vehicles, with sale prices 216 displayed. Often with vehicles, there are federal, state, and/or local tax rebates available, e.g., for the purchase of electric vehicles or other vehicles with reduced carbon or other emissions, and there may be additional incentives provided by, e.g., manufacturers or dealerships, that may reduce the overall price of a vehicle. Users may generally be unaware of these potential savings or, even if aware, have trouble navigating the process of determining their qualifications for the price reductions and how to confirm that they may be applied to their purchase. The electronic application 208 may take the form of a program, plugin, browser extension, etc., that has the functionality to search for and identify reductions associated with the items for sale on a given platform and display (or otherwise serve or make available) that information to the user. In the example shown in FIG. 2A, the second electronic application 208 may access, e.g., a Transportation Laws and Incentives API, which includes information about the federal, state, and local rebates and incentives available to a user purchasing a vehicle. The electronic application 208 may include programming that associates an on-line platform with the sale of a specific item, and may be programmed to access a given API as a function of the on-line platform accessed.

Alternatively or in conjunction with API call-ups, the electronic application 208 may use a machine learning model for identifying reductions (outputs) based on user information and items associated with an on-line platform (inputs). For example, the electronic application 208 may access a trained machine learning model that has been trained on user information including, e.g., location, gross income, vehicle purchased, date of purchase, location of purchase, etc., and on-line platforms on which purchases were made, to learn the reductions received and/or used by those users and the availability of those reductions to a specific user.

Once the one or more potential reductions 210 are identified, they may be displayed via the electronic application 208 within the same display of user device 105, such as in a pop-up window. In the example shown in FIG. 2A, the pop-up window associated with electronic application may include one or more possible reductions 210 via the user-selectable links 212. In this example, there may be an identification of the possible reductions, such as with the pop-up text "Did you know, there are up to $5,500 in rebates and incentives when you purchase an EV?" The precise text may be determined by programming within the electronic application, and may depend on the trained machine learning model, as described below, to identify the possible reductions available to the user. This may be based on the user's location, as may be determined by the IP address of the user device used to access the electronic application, or a location of search/filter criteria entered into the website 204 and read (or scraped) by electronic application 208, and other user data that may be stored on the user device 105 and accessed by the electronic application 208.

In the example shown in FIG. 2A, the possible reductions may include such reductions as tax incentives and rebates available when purchased through the first platform 202, Platform A, Platform B, or Platform C, each of which may be a platform that guides users through the tax incentives and rebates available to a user purchasing an electric vehicle in the example shown. A first user-selectable link 212 associated with some or all of the text associated with Platform A may populate the first platform 202 with the reductions available through Platform A by, for example, updating the GUI to display prices and other information pertinent to the items such as rebates, incentives, etc. The first user-selectable link 212 may also cause display of Platform A on the display of the user device 105. A second user-selectable link 212 associated with some or all of the text associated with Platform B may either populate the first platform 202 with the reductions available through Platform B, or cause display of Platform B on the display of the user device 105. Similarly, a third user-selectable link 212 associated with some or all of the text associated with Platform B may either populate the first platform 202 with the reductions available through Platform B, or cause display of Platform B on the display of the user device 105.

Figure 2B:
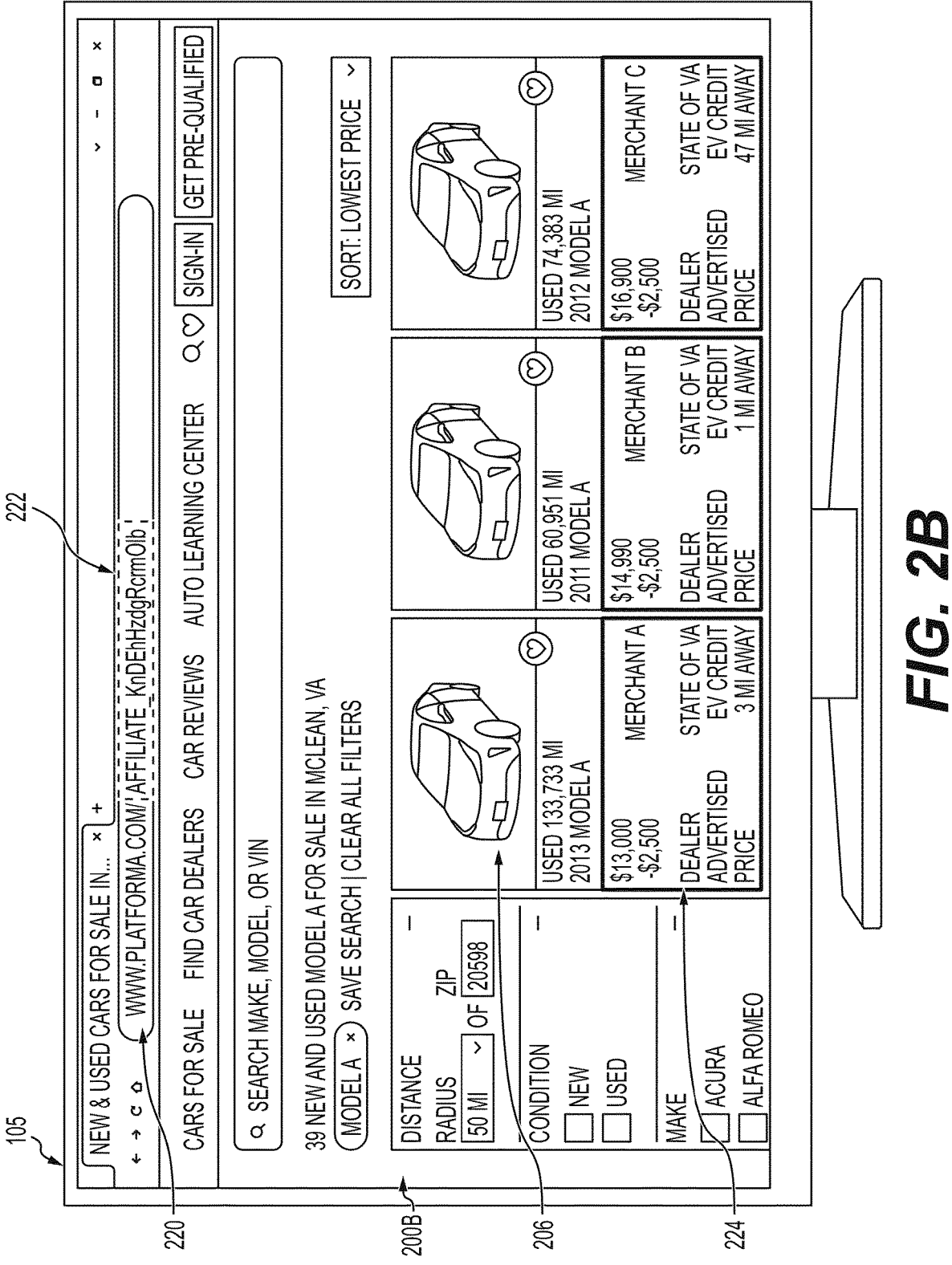
FIG. 2B depicts a sample GUI including an updated on-line platform, according to one or more embodiments.

FIG. 2B depicts a sample GUI 200B including a second on-line platform 220, according to one or more embodiments, that is displayed on the user device 105 when a user selects a user-selectable link 212 in the electronic application. In this example, the user has been redirected to a second on-line platform 220 associated with platform A as a result of selecting the link 212 shown in FIG. 2A associated with platform A. Appendend affiliate text 222 is generated by the electronic application 208 and appended to the URL for the second on-line platform 220 to preserve the information gleaned from the user interaction with the first on-line platform. This information may include information entered by the user into user input fields, such as search queries, location data such as zip code and state, and demographic data such as tax status, income information, and other information usable in determining if a user qualifies for federal, state, and local rebates and incentives.

Reduced prices 224 may be displayed on the second on-line platform 220 based on the information received above, the reduced prices 224 reflecting the original sale prices 216 described in FIG. 2A less the possible reductions 210 identified by the electronic application 208. By way of comparison, if a user were to access platform A directly and not via a selectable link 212 from the electronic application 208, the possible reductions 210 would not be reflected and the prices shown in platform A would be the original sale prices 216. In such a manner, techniques according to the present disclosure modify the output elements of a GUI and/or display as a result of a user-selectable interaction, the modification of elements better situating a user to identify the rebates, incentives, and other reductions via a specific, structured, GUI.

FIG. 3 depicts a flowchart of an exemplary method 300 of identifying and displaying potential reductions, according to one or more embodiments.

At step 310, the method may include monitoring a user interaction to detect a first on-line platform being launched, such as the launching of a website on a browser of a personal computer, or the opening of a mobile application on a mobile device. The first on-line platform may include a program, data structure, data or code library, framework, plugin, or the like incorporated into a website, or may encompass the website itself including functionality of a platform. The detected user interaction may be the launching of a website by entering a URL into a web browser, selecting a link that launches the website in a browser, the opening of a mobile application in a mobile device, or other interaction with a website or mobile application, such as inputting data into a field presented on the website or in the mobile application, selecting a link or other data object in the website or mobile application, etc.

At step 320, the method may include receiving from a user input device associated with a user, user input associated with the first on-line platform. The user input may be retrieved from a server associated with the user device or the first on-line platform and may include, for example, demographic information, location data, etc. The user may also be prompted to enter data into data fields presented in the first on-line platform. For example, where the first on-line platform is a website offering vehicles for purchase, a user may be prompted to enter data related to vehicle preferences, such as type of vehicle, vehicle age (e.g., used versus new), vehicle color, mileage, preferred price range, etc., and may be prompted to input personal demographic data, such as tax filing status, income, location, etc.

At step 330, the method may proceed to identifying an item associated with the first on-line platform. For example, the method may identify that the first on-line platform is a platform for the sale and purchase of used and new vehicles.

At step 340, the method may comprise automatically identifying one or more potential reductions associated with the item. This may be based on further inputs from the user. To that end, the method may further include causing display of an input field on the display of the user device, the input field for receiving one or more data elements related to the user, and updating the potential reduction based on the one or more received data elements.

The automatically identifying one or more potential reductions associated with the item at step 340 may be performed using a trained machine learning model and using the information input by the user to input into the machine learning model, such as location data from the user and search terms for types of itmes. The machine learning model may be trained on user data associated with the user and item data associated with the item. This training data may include items, reductions associated with the items, and location-based data associated with the demographics of the users, as may be determined by the IP address of a user device used to access the electronic application, or a location of search/filter criteria entered into a website and read (or scraped) by an electronic application and delivered to the machine learning model, and other user data that may be stored on a user device 105 and accessed by an electronic application and delivered to the machine learning model.

Alternatively, the automatically identifying one or more potential reductions associated with the item comprises receiving reduction data from a server based on a command of an application programming interface (API) invoked upon receiving the user input associated with the on-line platform. The method may include receiving instructions for API's associated with particular items. For example, where the item is a vehicle, the API may be the transportation laws API that includes federal, state, and local tax rebates and other incentives associated with the purchase of specific vehicles. The API invoked may be based on the determination in step 330 regarding the item associated with the first on-line platform, where the APIs to be called are chosen based on the item for sale. For example, where the item for sale is a vehicle, the method may include calling the transportation laws API. In other examples, the method may be directed to identifying reductions for items relating to home improvements; such as heat pumps, heat pump water heaters, insulation, doors and windows, other weatherization services, and electrical panel upgrades, as non-limiting examples. Further examples include clean energy equipment, such as solar, wind energy, geothermal heat pumps, central air conditioners, water heaters, or battery storage. These non-limiting examples are directed to reductions available for encouraging environmentally conscious choices by consumers, businesses, and other entities. However, reductions may be identified for any items that are subject to reductions in the form of tax credits, third party rebates, seller rebates, manufacturers' rebates, coupons, etc.

At step 350, the method may include, responsive to identifying the one or more potential reductions, causing display of an electronic application including an indication of the one or more potential reductions at a display of the user input device, the electronic application operating in conjunction with the first on-line platform and including a user-selectable link.

At step 360, the method may, upon determining that the user selects the user-selectable link, include (step 362) updating the first on-line platform to display the one or more potential reductions for the item on the first platform 202, or (step 364) causing display of a second on-line platform on the display of the user device and displaying the one or more potential reductions for the item on the second on-line platform.

At step 362, updating the first on-line platform to display the one or more potential reductions for the item on the first on-line platform may include updating the first on-line platform to include text of the one or more reductions.

At step 364, causing display of the second on-line platform on the display of the user device and displaying the one or more potential reductions for the item on the second on-line platform may include appending affiliate text to a uniform resource locator (URL) of the second on-line platform.

As disclosed herein, one or more implementations disclosed herein may be applied by using a machine learning model, such as the automatically identifying one or more potential reductions associated with the item at step 340. A machine learning model as disclosed herein may be trained using one or more components or steps of FIGS. 1-3. As shown in flow diagram 410 of FIG. 4, training data 412 may include one or more of stage inputs 414 and known outcomes 418 related to a machine learning model to be trained. The stage inputs 414 may be from any applicable source including a component or set shown in the figures provided herein. The known outcomes 418 may be included for machine learning models generated based on supervised or semi-supervised training. An unsupervised machine learning model might not be trained using known outcomes 418. Known outcomes 418 may include known or desired outputs for future inputs similar to or in the same category as stage inputs 414 that do not have corresponding known outputs.

The training data 412 and a training algorithm 420 may be provided to a training component 430 that may apply the training data 412 to the training algorithm 420 to generate a trained machine learning model 450. According to an implementation, the training component 430 may be provided comparison results 416 that compare a previous output of the corresponding machine learning model to apply the previous result to re-train the machine learning model. The comparison results 416 may be used by the training component 430 to update the corresponding machine learning model. The training algorithm 420 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 410 may be a trained machine learning model 450.

A machine learning model disclosed herein may be trained by adjusting one or more weights, layers, and/or biases during a training phase. During the training phase, historical or simulated data may be provided as inputs to the model. The model may adjust one or more of its weights, layers, and/or biases based on such historical or simulated information. The adjusted weights, layers, and/or biases may be configured in a production version of the machine learning model (e.g., a trained model) based on the training. Once trained, the machine learning model may output machine learning model outputs in accordance with the subject matter disclosed herein. According to an implementation, one or more machine learning models disclosed herein may continuously update based on feedback associated with use or implementation of the machine learning model outputs.

It should be understood that embodiments in this disclosure are exemplary only, and that other embodiments may include various combinations of features from other embodiments, as well as additional or fewer features.

Figure 4:
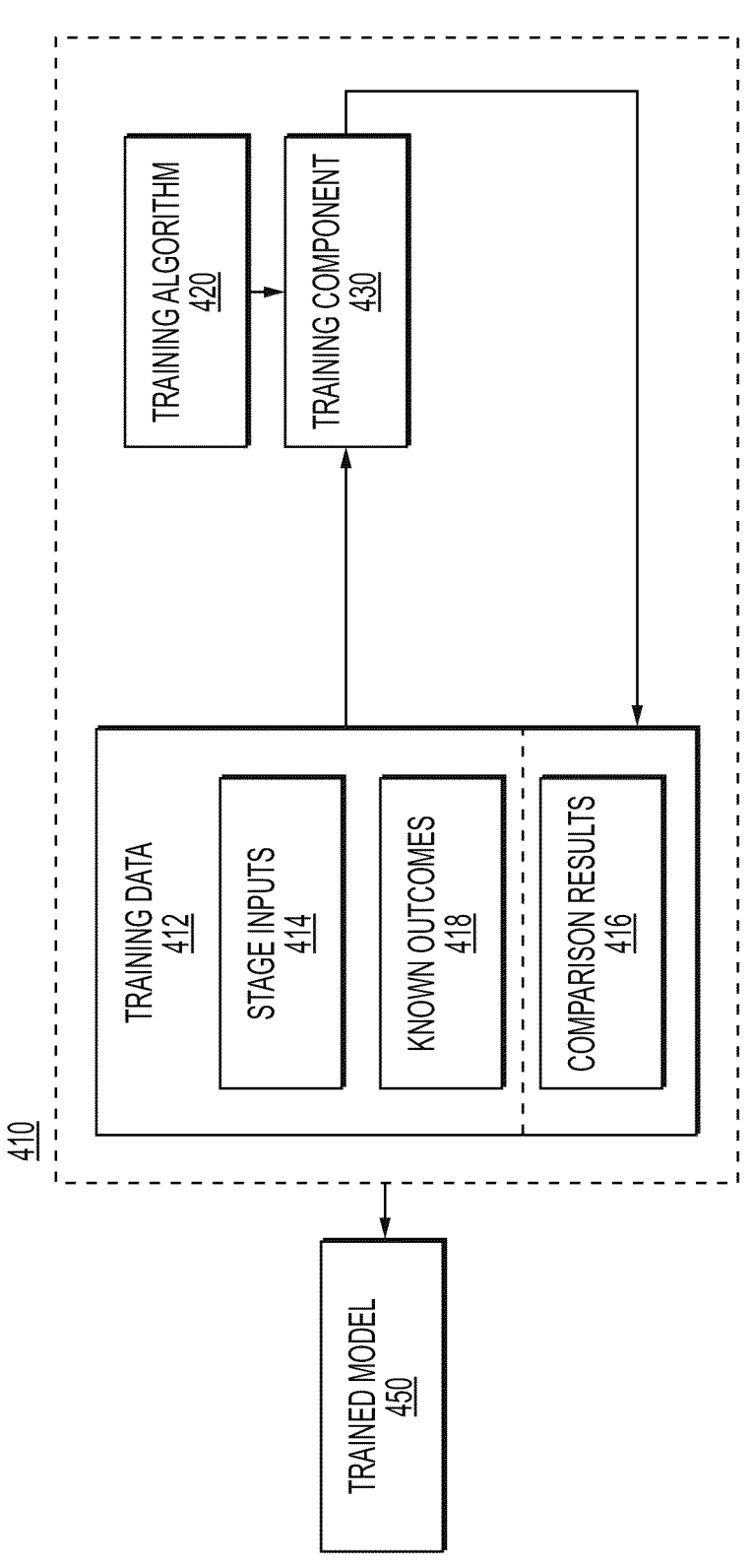
FIG. 4 depicts a flow diagram for training a machine learning model, according to one or more embodiments.

In general, any process discussed in this disclosure that is understood to be computer-implementable or computer-implemented, such as the processes illustrated in FIGS. 3 and 4, may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 5:
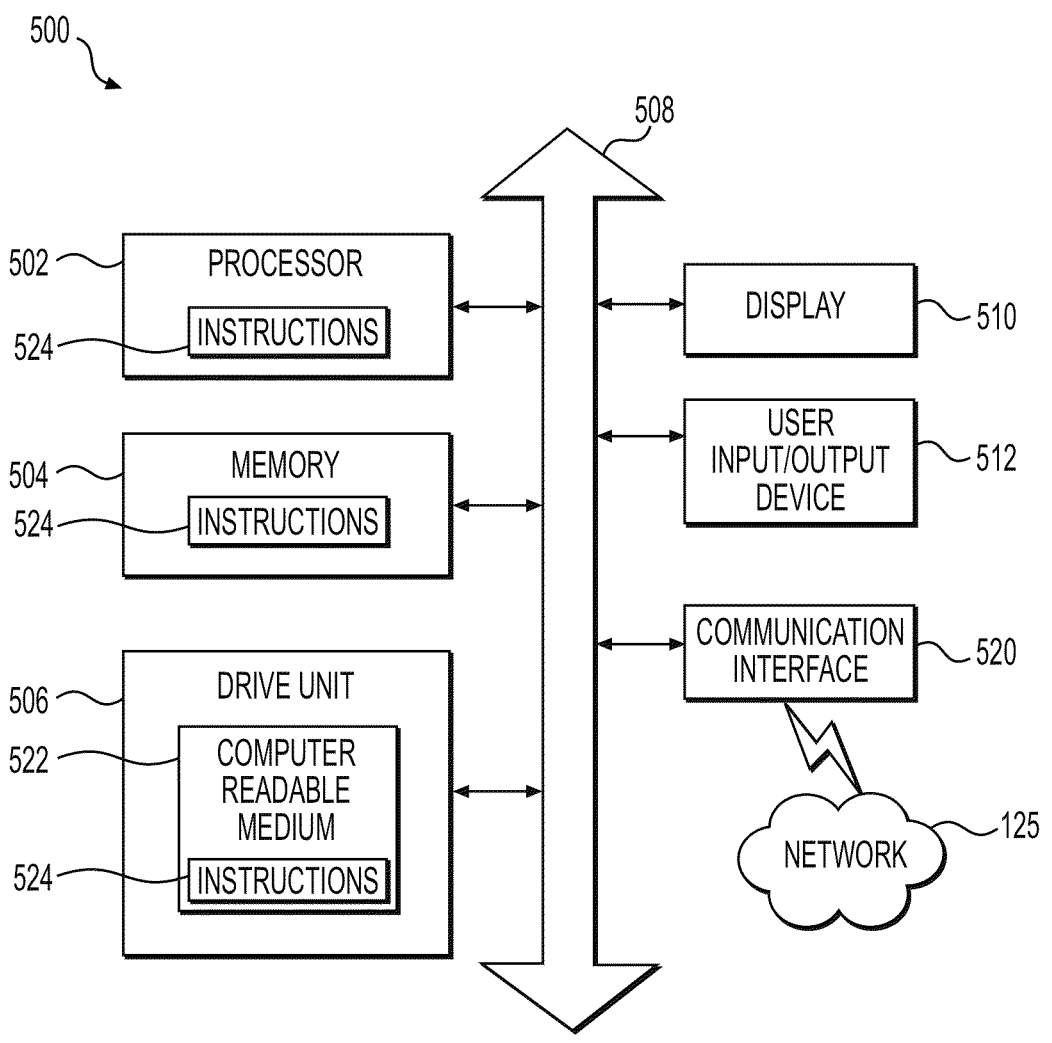
FIG. 5 depicts an example of a computing device, according to one or more embodiments.

FIG. 5 is a simplified functional block diagram of a computer system 500 that may be configured as a device for executing the processes of FIGS. 3 and 4, according to exemplary embodiments of the present disclosure. FIG. 5 is a simplified functional block diagram of a computer that may be configured to serve as the user device 105, the application programming interface 110, and/or the custodian server 115, according to exemplary embodiments of the present disclosure. In various embodiments, any of the systems herein may be an assembly of hardware including, for example, a data communication interface 520 for packet data communication. The platform also may include a central processing unit ("CPU") 502, in the form of one or more processors, for executing program instructions. The platform may include an internal communication bus 508, and a storage unit 506 (such as ROM, HDD, SDD, etc.) that may store data on a computer readable medium 522, although the system 500 may receive programming and data via network communications including via network 125. The system 500 may also have a memory 504 (such as RAM) storing instructions 524 for executing techniques presented herein, although the instructions 524 may be stored temporarily or permanently within other modules of system 500 (e.g., processor 502 and/or computer readable medium 522). The system 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to diagnosing a technology environment, it should be appreciated that the presently disclosed embodiments may be applicable to navigating and/or monitoring a technology environment for any other purpose.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes depicted in FIGS. 3 and 4, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for identifying online reductions, the computer-implemented method comprising:

monitoring, by one or more processors, a user interaction to detect a first on-line platform being launched;

receiving, by the one or more processors, from a user device associated with a user, a user input associated with the first on-line platform;

identifying, by the one or more processors, an item associated with the first on-line platform;

automatically identifying, by at least one third-party server, one or more potential reductions associated with the item based on a command of an application programming interface (API) invoked upon receiving the user input and identifying the item associated with the first on-line platform;

responsive to identifying the one or more potential reductions, causing display of an electronic application including an indication of the one or more potential reductions at a display of the user device, the electronic application operating in conjunction with the first on-line platform and including a user-selectable link; and upon determining that the user selects the user-selectable link, updating the first on-line platform to display the one or more potential reductions for the item on the first on-line platform, or causing display of a second on-line platform on the display of the user device and displaying the one or more potential reductions for the item on the second on-line platform.

2. The computer-implemented method of claim 1, wherein updating the first on-line platform to display the one or more potential reductions for the item on the first on-line platform includes updating the first on-line platform to include text of the one or more potential reductions.

3. The computer-implemented method of claim 1, further comprising:

causing display of an input field on the display of the user device, the input field for receiving one or more data elements related to the user.

4. The computer-implemented method of claim 3, further comprising:

receiving the one or more data elements related to the user; and updating the one or more potential reductions based on the one or more data elements.

5. The computer-implemented method of claim 1, wherein causing display of the second on-line platform on the display of the user device and displaying the one or more potential reductions for the item on the second on-line platform includes appending affiliate text to a uniform resource locator (URL) of the second on-line platform.

6. The computer-implemented method of claim 1, wherein automatically identifying the one or more potential reductions associated with the item is performed using a trained machine learning model.

7. The computer-implemented method of claim 6, wherein the trained machine learning model has been trained on user data associated with the user and item data associated with the item to predict the one or more potential reductions.

8. The computer-implemented method of claim 1, wherein the one or more potential reductions include one or more of a rebate or a tax incentive.

9. The computer-implemented method of claim 8, wherein the item is a vehicle and the API is a transportation laws API.

10. The computer-implemented method of claim 1, wherein the user interaction is an interaction with a browser.

11. The computer-implemented method of claim 1, wherein the at least one third-party server is at least one of an insurance application, a government services application, a social media application, or a rewards membership application.

12. A computer-implemented method for identifying on-line reductions, the computer-implemented method comprising:

monitoring, by one or more processors, a user interaction to detect a first on-line platform being launched;

receiving, by the one or more processors, from a user device associated with a user, a user input associated with the first on-line platform;

identifying, by the one or more processors, an item associated with the first on-line platform;

automatically identifying, by at least one third-party server, one or more potential reductions associated with the item based on a command of an application programming interface (API) invoked upon receiving the user input and identifying the item associated with the first on-line platform, wherein the one or more potential reductions include one or more of a rebate or a tax incentive;

responsive to identifying the one or more potential reductions, causing display of an electronic application including an indication of the one or more potential reductions at a display of the user device, the electronic application operating in conjunction with the first on-line platform and including a user-selectable link; and upon determining that the user selects the user-selectable link, updating the first on-line platform to display the one or more potential reductions for the item on the first on-line platform, or causing display of a second on-line platform on the display of the user device and displaying the one or more potential reductions for the item on the second on-line platform.

13. The computer-implemented method of claim 12, wherein updating the first on-line platform to display the one or more potential reductions for the item on the first on-line platform includes updating the first on-line platform to include text of the one or more potential reductions.

14. The computer-implemented method of claim 12, wherein causing the display of the second on-line platform on the display of the user device and displaying the one or more potential reductions for the item on the second on-line platform includes appending affiliate text to a uniform resource locator (URL) of the second on-line platform.

15. The computer-implemented method of claim 12, further comprising:

causing the display of an input field on the display of the user device, the input field for receiving one or more data elements related to the user.

16. The computer-implemented method of claim 15, further comprising:

receiving the one or more data elements related to the user; and updating the one or more potential reductions based on the one or more data elements.

17. The computer-implemented method of claim 12, wherein automatically identifying the one or more potential reductions associated with the item is performed using a trained machine learning model, wherein the trained machine learning model has been trained on user data associated with the user and item data associated with the item to predict the one or more potential reductions.

18. The computer-implemented method of claim 12, wherein the item is a vehicle and the API is a transportation laws API.

19. The computer-implemented method of claim 12, wherein the user interaction is an interaction with a browser.

20. A system, the system comprising:

at least one memory storing instructions; and at least one processor operatively connected to the at least one memory, and configured to execute the instructions to perform operations for identifying on-line reductions, the operations including:

monitoring, by one or more processors, a user interaction to detect a first on-line platform being launched;

receiving, by the one or more processors, from a user device associated with a user, a user input associated with the first on-line platform;

identifying, by the one or more processors, an item associated with the first on-line platform;

automatically identifying, by at least one third-party server, one or more potential reductions associated with the item based on a command of an application programming interface (API) invoked upon receiving the user input and identifying the item associated with the first on-line platform;

responsive to identifying the one or more potential reductions, causing display of an electronic application including an indication of the one or more potential reductions at a display of the user device, the electronic application operating in conjunction with the first on-line platform and including a user-selectable link; and upon determining that the user selects the user-selectable link, updating the first on-line platform to display the one or more potential reductions for the item on the first on-line platform, or causing display of a second on-line platform on the display of the user device and displaying the one or more potential reductions for the item on the second on-line platform.

* * * * *